Aug. 8, 1939.  N. J. DZIEDZIC ET AL  2,168,703
SKINNING KNIFE
Filed June 10, 1936   3 Sheets-Sheet 1
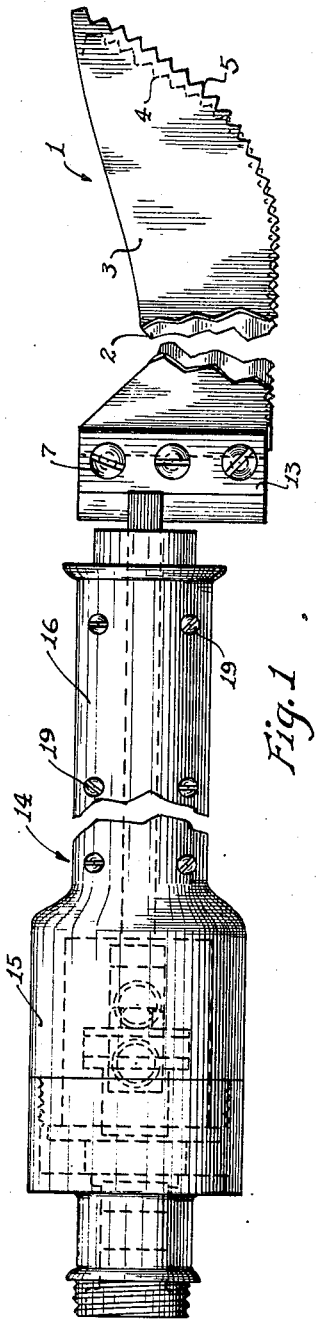
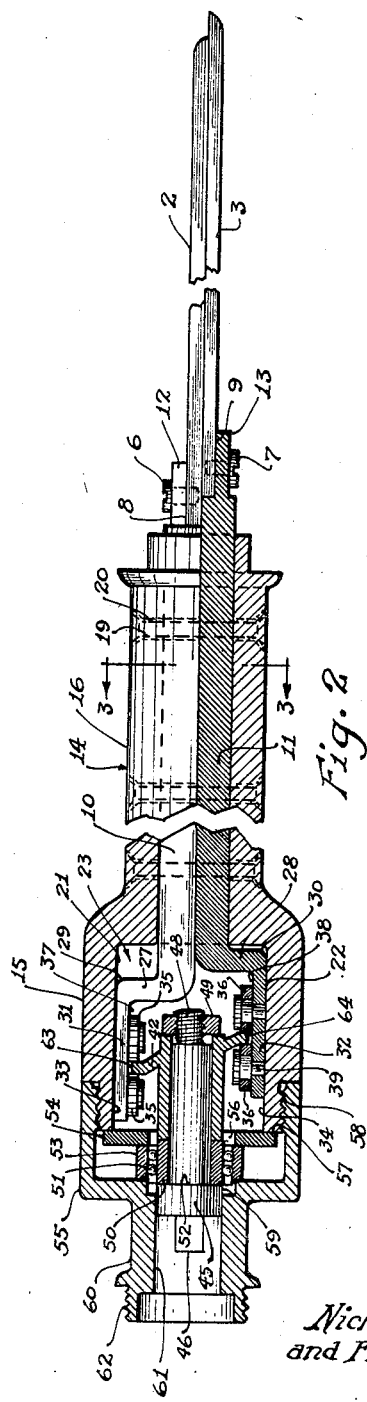
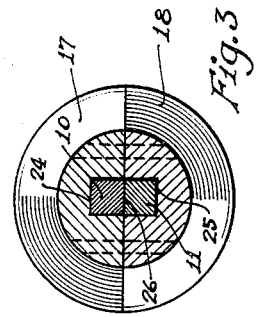
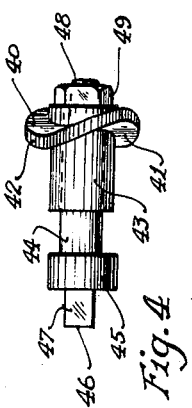
Nicholas J. Dziedzic
and Frank B. Bratek
INVENTORS Aug. 8, 1939.  N. J. DZIEDZIC ET AL  2,168,703
SKINNING KNIFE
Filed June 10, 1936   3 Sheets-Sheet 2

Nicholas J. Dziedzic
and Frank B. Bratek
INVENTORS

BY
ATTORNEY

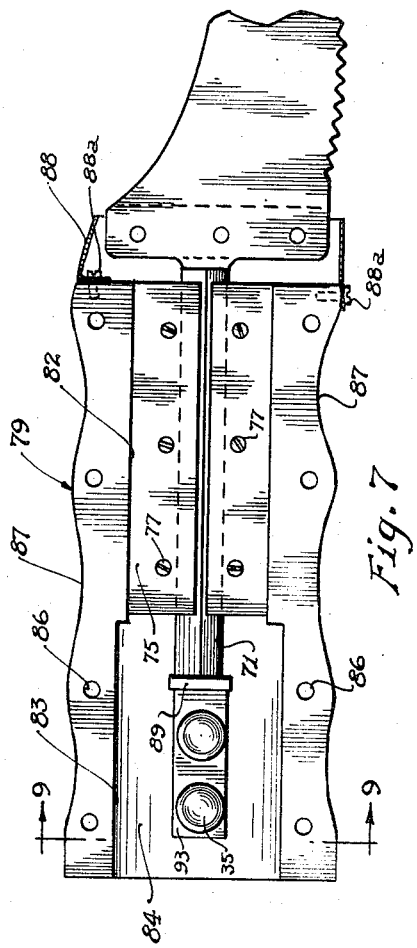

Patented Aug. 8, 1939

2,168,703

UNITED STATES PATENT OFFICE 2,168,703

SKINNING KNIFE

Nicholas J. Dziedzic and Frank B. Bratek, Chicago, Ill., assignors to Industrial Patents Corporation, Chicago, Ill., a corporation of Delaware Application June 10, 1936, Serial No. 84,409

5 Claims. (Cl. 30—272)

This invention relates to a skinning device.

One of the objects of the invention is to provide an improved skinning device.

Another object of the invention is to provide an improved skinning knife having a serrated cutting edge.

Another object of the invention is to provide an improved skinning knife which comprises a pair of knife blades having serrated cutting edges slidably mounted in parallel abutting relationship, and means for reciprocating the knife blades in a relatively opposite movement.

Another object of the invention is to provide an improved skinning knife which comprises a pair of knife blades having serrated cutting edges slidably mounted in parallel abutting relationship, and power driven cam means for reciprocating the knife blades in a relatively opposite movement.

Other objects of the invention will be apparent from the description and claims which follow.

The knife portion of the skinning knife, constructed in accordance with the present invention, is relatively long and thin and may be operated in long sweeping strokes in much the same manner as the conventional butchering knife. The serrated cutting edges and relatively opposite reciprocating movements of the several blades mounted in parallel abutting relationship provide a series of independent scissor-like movements by which positive cutting of the fatty tissue between the skin and the muscular tissue of the meat is accomplished without marking or otherwise injuring the subcutaneous layer of the severed skin. By use of the present invention the skins are quickly severed and a material saving in labor and time is realized.

In the accompanying drawings, similar reference characters in the several figures are used to designate similar parts.

Figure 1 is a side view illustrating one embodiment of the skinning knife constructed in accordance with the present invention.

Figure 2 is a plan view, partly in section, of Figure 1.

Figure 3 is a sectional view taken on line 3—3 of Figure 2.

Figure 4 is a detail view of the cam means for reciprocating the knife blades.

Figure 7 is a side view taken on the line 7—7 of Figure 9.

Figure 8 is a sectional view taken on the line 8—8 of Figure 10.

Figure 9 is a sectional view taken on the line 9—9 of Figure 7.

Figure 10 is a sectional view taken on the line 10—10 of Figure 8.

Figure 5:
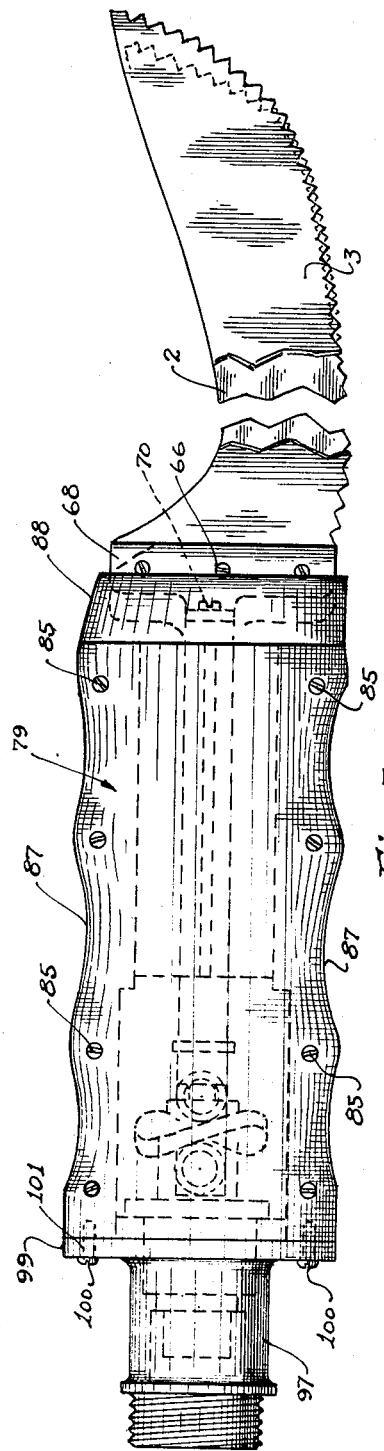
Figure 5 is a side view, partly broken away, illustrating another embodiment of the skinning knife constructed in accordance with the present invention.

Referring to Figures 1 to 4, the knife portion 1 of the skinning knife, constructed in accordance with the present invention, comprises a pair of relatively long, thin knife blades 2 and 3 slidably mounted in parallel abutting relationship and having serrated cutting edges 4 and 5, which serrated cutting edges cooperate to provide a series of independent cutting movements during the cutting operation.

Knife blades 2 and 3 are connected at their rearward ends as by screws 6 and 7 within recesses 8 and 9 of arms 12 and 13 formed integral with connecting rods 10 and 11.

Connecting rods 10 and 11 are substantially square in cross section and are slidably mounted within housing 14. Housing 14 comprises cylinder 15 having a reduced shank portion 16. Housing 14 is formed of sections 17 and 18 of cast metal or other suitable material fixedly connected as by bolts 19 passed through openings 20. Sections 17 and 18 are recessed as at 21 and 22 to form cam chamber 23 and grooved as at 24 and 25 to provide bearing surfaces for three of the faces of each of the connecting rods 10 and 11. In assembling sections 17 and 18 the remaining faces of connecting rods 10 and 11 are placed in parallel abutting relationship as at 26, whereby each of the connecting rods provides a bearing surface for the abutting face of the other.

Connecting rods 10 and 11, as they extend within chamber 23, are bent outwardly as at 27 and 28 and inwardly as at 29 and 30 to provide arms 31 and 32 in slidable engagement against walls 33 and 34 of chamber 23. Spaced bearing rollers 35 and 36 are rotatably secured against oppositely disposed faces 37 and 38 of arms 31 and 32 by suitable pivot pins 39.

Knife blades 2 and 3 are reciprocated in a relatively opposite movement through the medium of cam surfaces 40 and 41 of cam disk 42 rotatably mounted between spaced rollers 35 and 36. Cam disk 42 is formed integral with cam sleeve 43 for mounting upon drive shaft 44. Shaft 44 is provided at one end with annular enlargement 45 and shank 46, which shank 46 is provided with squared surfaces 47. At its opposite end shaft 44 is threaded as at 48 for the reception of nut 49. Race 50, of anti-friction bearing 51, and cam sleeve 43 are respectively mounted on shaft 44 against thrust surface 52 of enlargement 45 and secured against longitudinal displacement on shaft 44 by nut 49. Cam sleeve 43 may be pinioned or otherwise secured to shaft 44.

The cam assembly, comprising shaft 44, bearing 51 and cam disk 42, is rotatably mounted within chamber 23 and secured against longitudinal displacement by race 53 of the bearing 51, which race 53 is fixedly secured between bushing 54 and cap 55. Bushing 54 is fitted against race 53 at opening 56 and against the end wall 57 of cylinder 15. Cap 55 is then threaded on cylinder 15 as at 58 sufficient to wedge race 53 in a fixed position against bushing 54.

Enlargement 45 and shank 46 of the shaft 44 extend through cap 55 at opening 59. Cylinder 60 is formed integral with cap 55 at opening 59 and is machined at its inner wall 61 to provide a bearing surface for enlargement 45. The bearing arrangement of enlargement 45 against wall 61 serves to cooperate with anti-friction bearing 53 to prevent axial displacement of shaft 44.

In use cam surfaces 40 and 41 of cam disk 42 are rotatably mounted between spaced rollers 35 and 36. Cam disk 42 serves to reciprocate connecting rods 10 and 11 and thus knife blades 2 and 3 in a relatively opposite movement. Shaft 44 and disk 42 may be rotatably driven by an electric motor or other source of power not shown, the motor being preferably remotely connected with shaft 44 through the medium of a flexible shaft provided with a suitable coupling for engagement with shank 46. Cylinder 60 is threaded at its free end as at 62 for the reception of suitable means operably connected with the flexible shaft for fixedly securing the coupling against the shank 46 during operation of the skinning knife.

The cam surfaces 40 and 41 are formed in parallel relationship to provide high points as at 63 and corresponding low points as at 64 respectively spaced at intervals of 180° on the cam periphery, such that in operation one of the knife blades will be at the extent of its rearwardmost movement when the other of the knife blades is at the extent of its forwardmost movement. The radial surfaces of cam disk 42 may comprise one or more high points with a corresponding number of low points, it being apparent that for every cycle of the cam disk the knife blades 2 and 3 will complete two movements to the extreme positions for each high point and its respective low point formed in the cam surfaces.

Referring to Figures 5 to 10, knife blades 2 and 3 are connected as by screws 65 and 66 to angle brackets 67 and 68, which brackets 67 and 68 are secured as by bolts 69 and 70 to connecting rods 71 and 72.

Connecting rods 71 and 72 are slidably mounted within longitudinal openings 73 and 74 in bearing blocks 75 and 76. Connecting rods 71 and 72, while substantially square in cross section, are arranged in substantially diamond formation relative to the mounting of the knife blades 2 and 3. By this arrangement bearing surfaces for each of the faces of connecting rods 71 and 72 are provided within bearing blocks 75 and 76. This arrangement also provides an equal distribution of pressure resulting from the cutting action between all of the bearing surfaces of the connecting rods 71 and 72.

The bearing blocks 75 and 76 are secured as a unit by bolts 77 in openings 78 and the bearing unit is detachably mounted within casing 79 to permit economical replacement thereof.

Casing 79 comprises sections 80 and 81 formed of wood or other suitable material. Sections 80 and 81 are recessed as at 82 to provide a pressed fit for bearing blocks 75 and 76 and at 83 to provide cam chamber 84. Sections 80 and 81 are joined by bolts 85 in openings 86.

Notches 87 are formed along the upper and lower longitudinal edges of casing 79 to provide means for gripping the implement during the cutting operation. Guard member 88 is formed of sheet metal or other suitable material and is permanently secured by screws 88a to the forward end of casing 79 to prevent possible injury to the operator at that point.

Angles 89 and 90 are welded or otherwise secured to connecting rods 71 and 72 as at 91 and 92 to provide spaced arms 93 and 94 presenting oppositely disposed faces 95 and 96 for carrying spaced bearing rollers 35 and 36.

Figure 6:
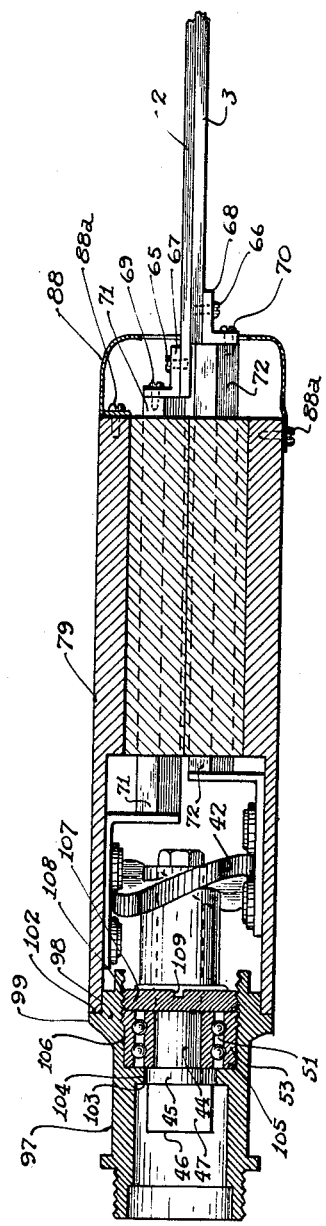
Figure 6 is a plan view, partly in section, of Figure 5.

As shown in Figure 6, the cam mechanism, comprising shaft 44, anti-friction bearing 51 and cam disk 42, is rotatably mounted within cylinder 97. Cylinder 97 is enlarged at one end as at 98 to conform to the inner wall of chamber 84. Enlargement 98 is flanged as at 99 and the cylinder 97 is fixedly mounted against casing 79 by screws 100, which screws are passed through openings 101 in flange 99 and into the end wall 102 of casing 79.

Cylinder 97 is flanged at its inner wall as at 103 to provide bearing surface 104 for enlargement 45 of the shaft 44 and abutment 105 for race 53 of bearing 51. Race 53 is fixedly wedged within recess 106 against abutment 105 by means of nut 107 threaded as at 108 within the end of cylinder 97. Race 53 serves to rotatably support shaft 44 against longitudinal displacement within cylinder 97. Nut 107 is provided with suitable wrench sockets 109.

We claim:

1. In a power-driven skinning knife including a pair of knife blades, means slidably mounting the knife blades in parallel abutting relationship comprising a casing provided at one end with a relatively large recess providing a drive chamber, a longitudinal bore extending from said recess through said casing, and a pair of connecting rods slidably mounted through said bore and projecting forwardly of said casing, each of said connecting rods being rigidly secured to one of said knife blades, and means including a cam member rotatably mounted in said drive chamber and operatively connected directly with said connecting rods to reciprocate said connecting rods and knife blades in a relatively opposite movement.

2. In a power-driven skinning knife including a pair of knife blades, means slidably mounting the knife blades in parallel abutting relationship comprising a casing provided at one end with a relatively large recess providing a drive chamber, a longitudinal bore substantially rectangular in cross section extending from said recess through said casing, and a pair of connecting rods each substantially rectangular in cross section slidably mounted through said bore and projecting forwardly of said casing, the walls defining said bore providing bearing surfaces to three faces of each of said connecting rods, the fourth face of each of said connecting rods providing a bearing surface to the fourth face of the other of said connecting rods, each of said connecting rods being rigidly secured to one of said knife blades, and means including a cam member rotatably mounted in said drive chamber and operatively connected directly with said connecting rods to reciprocate said connecting rods and knife blades in a relatively opposite movement.

3. In a power-driven skinning knife including a pair of knife blades, means slidably mounting the knife blades in parallel abutting relationship comprising a casing provided at one end with a relatively large recess providing a drive chamber, a longitudinal bore extending from said recess through said casing, a bearing block fixedly secured within said bore, a pair of parallel bores substantially rectangular in cross section and arranged in substantially diamond formation through said bearing block, and a pair of connecting rods substantially rectangular in cross section slidably mounted through the parallel bores of said bearing block and projecting forwardly of said casing, each of said connecting rods being rigidly secured to one of said knife blades, and means including a cam member rotatably mounted in the drive chamber and operatively connected directly with said connecting rods to reciprocate said connecting rods and knife blades in a relatively opposite movement.

4. In a power-driven skinning knife including a pair of knife blades, means slidably mounting the knife blades in parallel abutting relationship comprising a casing provided at one end with a relatively large recess providing a drive chamber, a longitudinal bore extending from said recess through said casing, a pair of connecting rods slidably mounted through said bore, the walls defining said bore providing bearing surfaces to three faces of each of said connecting rods, the fourth face of each of said connecting rods providing a bearing surface to the fourth face of the other of said connecting rods, said connecting rods at one of their ends extending forwardly of said casing and at their opposite ends into said drive chamber, each of said connecting rods as they extend forwardly of said casing being rigidly secured to one of said knife blades and as they extend within said drive chamber being provided with spaced arms presenting oppositely disposed faces, spaced bearing rollers mounted against each of said faces, and drive means for reciprocating said connecting rods and said knife blades in a relatively opposite movement, said drive means comprising a power-driven shaft and a cam member fixedly mounted on said shaft, said cam member being rotatable between the bearing rollers of each of said faces.

5. In a power-driven skinning knife including a pair of knife blades, means slidably mounting the knife blades in parallel abutting relationship comprising a casing provided at one end with a relatively large recess providing a drive chamber, a longitudinal bore extending from said recess through said casing, a bearing block fixedly secured within said bore, a pair of parallel bores substantially square in cross section and longitudinally arranged in substantially diamond formation through said bearing block, and a pair of connecting rods slidably mounted through the bores of said bearing block, said connecting rods at one of their ends extending forwardly of said casing and at their opposite ends into said drive chamber, each of said connecting rods as they extend forwardly of said casing being rigidly secured to one of said knife blades and as they extend within said drive chamber being provided with spaced arms presenting oppositely disposed faces, spaced bearing rollers mounted against each of said faces, and drive means for reciprocating said connecting rods and said knife blades in a relatively opposite movement, said drive means comprising a power-driven shaft rotatably mounted in said drive chamber and a cam member fixedly mounted on said shaft, said cam member being rotatable between the bearing rollers of each of said faces.

NICHOLAS J. DZIEDZIC.
FRANK B. BRATEK.